UNITED STATES PATENT OFFICE.

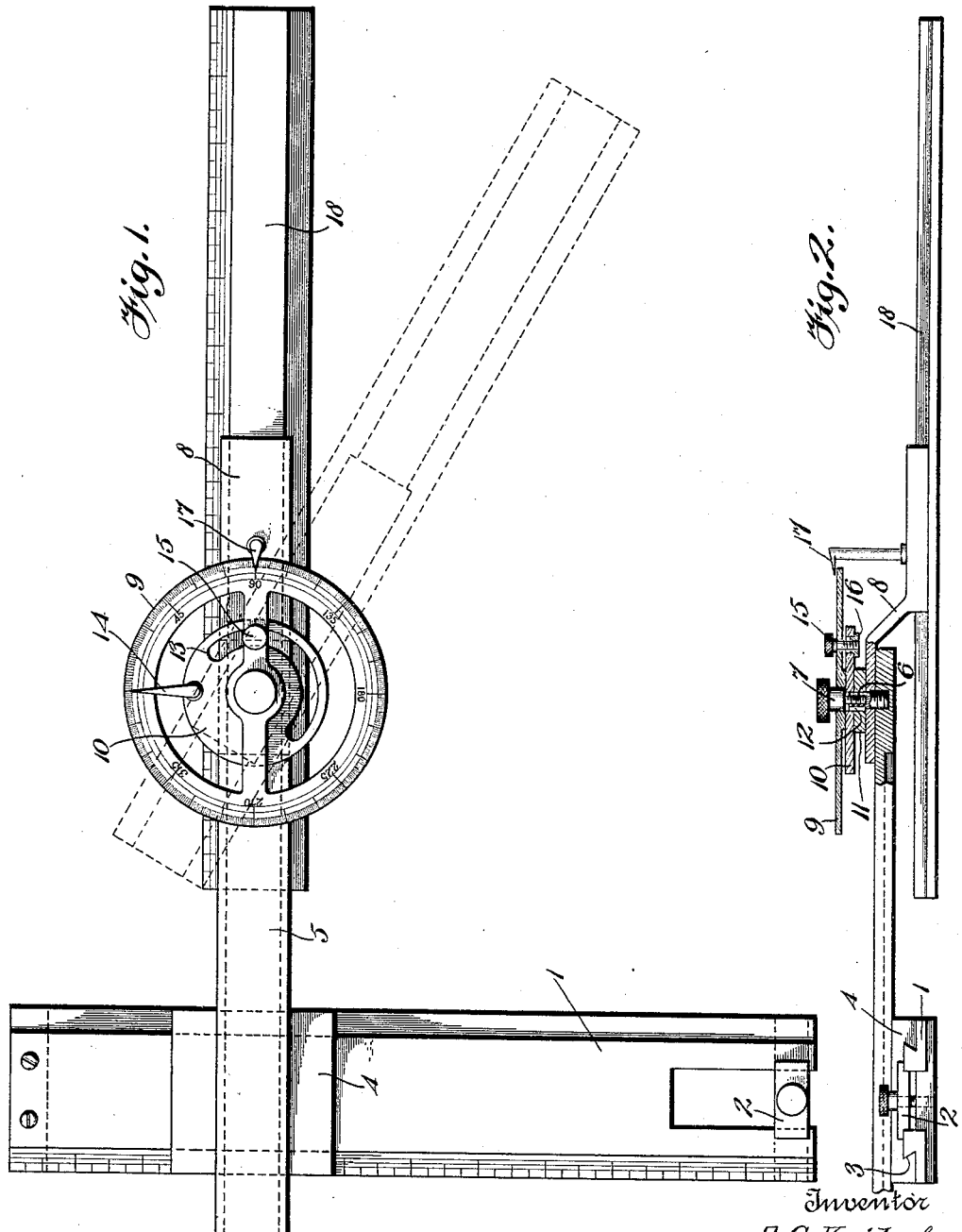

ARTHUR CLIFTON KAIL, OF THE UNITED STATES NAVY.

NAVIGATING-COMPASS RULE.

1,050,029.

Specification of Letters Patent. Patented Jan. 7, 1913.

Application filed April 9, 1912. Serial No. 689,565.

*To all whom it may concern:*

Be it known that I, ARTHUR C. KAIL, lieutenant, United States Navy, a citizen of the United States, at present stationed at Navy Yard, Puget Sound, State of Washington, have invented certain new and useful Improvements in Navigating-Compass Rules; and I do hereby declare the following to be a full, clear, and exact description of the invention, such as will enable others skilled in the art to which it appertains to make and use the same.

My invention relates to an improved navigating compass rule, and it consists in the constructions, combinations and arrangements herein described and claimed.

The object of my invention is to provide a navigating compass rule by which courses and bearings can be quickly determined and accurately plotted on a chart, and a ship's position accurately fixed from bearings of two or more objects, and it also provides the means for treating graphically the " variation " and deviation of a compass.

In the accompanying drawings forming a part of this application, and in which similar reference symbols indicate corresponding parts in the several views:—Figure 1 is a plan view, illustrating one embodiment of my invention; and Fig. 2 is a side elevation, partly broken away, of the construction shown in Fig. 1.

Referring to the drawings, 1 indicates a clamp rule provided with an adjustable stop 2 and with undercut guides 3 for a sliding bearing 4. A bar 5 is slidably mounted in the bearing 4 at right angles to said clamp rule 1, and carries a pivot 6, in which is threaded a thumb screw provided with an enlarged head 7; a holder 8 and compass-ring 9 being rotatably mounted for independent angular adjustment on said pivot 6 and screw head 7, respectively. A disk 10 and washer 11 are slidably mounted on the pivot 6, as by a spline 12; said disk being provided with a concentric slot 13 and with a pointer 14 coöperating with the index of the compass-ring 9. A screw 15 extends through the compass-ring 9 into threaded engagement with a nut 16 slidably mounted in the slot 13, thereby providing convenient means for clamping said compass-ring in its several adjusted positions. The holder 8 carries an indicator 17 in coöperative relation with the compass-ring 9, and is provided with radially-extending guides for slidably supporting a bearing-rule 18.

In the operation of my invention, the rule 1 is clamped on a chart along a meridian of true north. In charts not provided with meridians, or those having polychromic projections, the rule 1 is placed along a line of true north from the compass rose, and the bearing-rule 18 adjusted parallel to the rule 1 for transferring said line to any desired part of the chart; the rule 1 being then clamped along such transferred line of true north. The compass-ring 9 is then corrected by shifting its zero mark to the right or left of the fixed pointer 14 an angular distance equal to the compass variation, and locked in such position by the clamp screw 15. In this adjusted position of the compass-ring, the pointer 17 will indicate magnetic bearings. If compass bearings are desired, the compass ring is corrected also for the compass deviation. When the bearing of an object has been found, the holder 8 is adjusted to shift the pointer 17 to such bearing on the compass-ring 9, and clamped in said position by the enlarged head 7; the slidably-mounted bearing-rule 18 being then shifted for drawing a line to the object of said bearing.

In picking out a course, the bearing-rule 18 is adjusted in the desired direction, and the courses then read off by the indications of the pointer 17 on the compass-ring 9.

I have illustrated and described preferred and satisfactory constructions, but changes could be made within the spirit and scope of my invention.

I claim:—

1. In a navigating compass rule, the combination of a bearing-rule and compass-ring mounted for independent angular adjustment about a common axis, an indicator adjustable with said bearing-rule in coöperative relation to said compass-ring, and means for independently locking said bearing rule and compass-ring to permit free rotation of either independently of the other.

2. In a navigating compass rule, the combination of a clamp rule, a bearing slidably mounted thereon, a bar supported slidably in said bearing at right angles to said rule, a holder and compass-ring mounted on said bar for independent angular adjustment about a common axis, an indicator carried by said holder in coöperative relation to said compass-ring, means for independently locking said holder and compass-ring to permit free rotation of either independently of the other, and a bearing-rule slidably mounted in said holder.

3. In a navigating compass rule, the combination of a bearing-rule and a compass-ring mounted for independent angular adjustment about a common axis, a non-rotatable spacing member interposed between said rule and compass-ring, an indicator adjustable with said bearing-rule in coöperative relation to said compass-ring, means for locking said compass-ring to said non-rotatable spacing member in the several adjusted positions of said ring, and independent means for locking said bearing-rule against angular adjustment.

In testimony whereof, I affix my signature, in presence of two witnesses.

ARTHUR CLIFTON KAIL.

Witnesses:
C. B. CAVANAGH,
E. H. CAMPBELL.

Copies of this patent may be obtained for five cents each, by addressing the "Commissioner of Patents, Washington, D. C."